United States Patent [19]

Whatley, Jr.

[11] 4,220,851
[45] Sep. 2, 1980

[54] GAIN STABILIZATION FOR RADIOACTIVITY WELL LOGGING APPARATUS

[75] Inventor: Houston A. Whatley, Jr., Houston, Tex.

[73] Assignee: Texaco Inc., White Plains, N.Y.

[21] Appl. No.: 921,394

[22] Filed: Jul. 3, 1978

[51] Int. Cl.² .......................................... G01D 18/00
[52] U.S. Cl. .................................. 250/252; 250/262; 250/270
[58] Field of Search .............. 250/252, 262, 269, 270, 250/361 R, 363 R

[56] References Cited

U.S. PATENT DOCUMENTS

| 3,179,801 | 4/1965 | Scherbatskoy | 250/252 X |
| 3,225,195 | 12/1965 | Scherbatskoy | 250/252 X |
| 3,337,737 | 8/1967 | Eberhardt | 250/252 X |
| 3,916,685 | 11/1975 | Paap et al. | 250/262 X |
| 4,053,767 | 10/1977 | Kampfer et al. | 250/252 |

Primary Examiner—Davis L. Willis
Attorney, Agent, or Firm—Carl G. Ries; Thomas H. Whaley; William J. Beard

[57] ABSTRACT

A new and improved gain stabilization system for radioactivity well logging apparatus of the type having a scintillation crystal and optically coupled photomultiplier in a sonde to detect radiation in the borehole and formation elements in response to neutron bombardment. The gain stabilization system includes a light emitting diode driven by a pulser and furnishing scintillations to the photomultiplier, resulting in a stabilization pulse which is furnished to electronic circuitry at the surface for stabilization purposes.

10 Claims, 4 Drawing Figures

GAIN STABILIZATION FOR RADIOACTIVITY WELL LOGGING APPARATUS

BACKGROUND OF THE INVENTION

1. Field of Invention

The present invention relates to gain stabilization of radioactivity well logging apparatus.

2. Description of Prior Art

In radioactivity well logging, difficulties are experienced in stabilizing and gain matching the output of gamma ray detectors in the downhole sonde. In the past, a mercury pulser generated electrical stabilizer pulses which were provided to an electronic detector preamplifier. Thus, gain shifts which occurred within the detector crystal or photomultiplier tube were not measured or used for the purpose of gain stabilization and the effect of variations in detector or photomultiplier operation was in effect ignored.

Another system, that of U.S. Pat. No. 4,053,767, utilized a chemical radiation source mounted in a reference crystal which was embedded within a main scintillation crystal. In the event of damage or failure to any of these elements, the entire assembly, which was expensive, thus had to be replaced. Other stabilization techniques, such as in Nuclear Instruments and Methods, Vol. 124 (1975), pgs. 235–241, Norton-Holland Publishing Co., have suggested ZnS excitation and digital stabilization. Another approach suggested has been to gain check the photomultipliers, apparently under laboratory conditions, by simulating nuclear events without use of radioactive sources by utilizing light emitting diodes. Nuclear Instruments and Methods, Vol. 138 (1976), pgs. 57–59, Norton-Holland Publishing Co. So far as is known, this technique did not, however, lend itself to field service conditions in radioactive logging of wells.

SUMMARY OF INVENTION

Briefly, the present invention provides a new and improved gain stabilization apparatus in a radioactive well logging system. The well logging system includes a neutron source mounted in a sonde for movement in a well borehole to bombard earth formations and fluid in the vicinity of a well borehole with neutrons. A scintillation crystal mounted in the sonde emits flashes of light in response to gamma radiation resulting from the neutron bombardment. The light flashes from the crystal are provided to a photomultiplier tube which forms electrical signals for transmission to surface instrumentation for processing.

The gain stabilization apparatus of the present invention includes a light emitting diode which is caused to emit optical stabilization pulses by an oscillator circuit. The light emitting diode is mounted between the scintillation crystal and the photomultiplier in the sonde in an optically transparent disk, so that the light flashes of the light emitting diode are also sensed by the photomultiplier tube. Thus, with the present invention, stabilization and synchronization pulses are generated in the optical portion of the detectors and compensation for, and stabilization of variations in gain through the entire detection system, both optical and electronic, may thus be made. Further, the stabilization apparatus is separable from the crystal and photomultiplier, and spare stabilization apparatus can be kept on hand in a temperature compensated condition simplifying repair and maintenance. The stabilization apparatus is also located in a temperature controlled dewar flask with the detector and crystal and with a temperature compensating circuit minimizing temperature differences between these components.

DESCRIPTION OF THE PREFERRED EMBODIMENT

Figure 1:
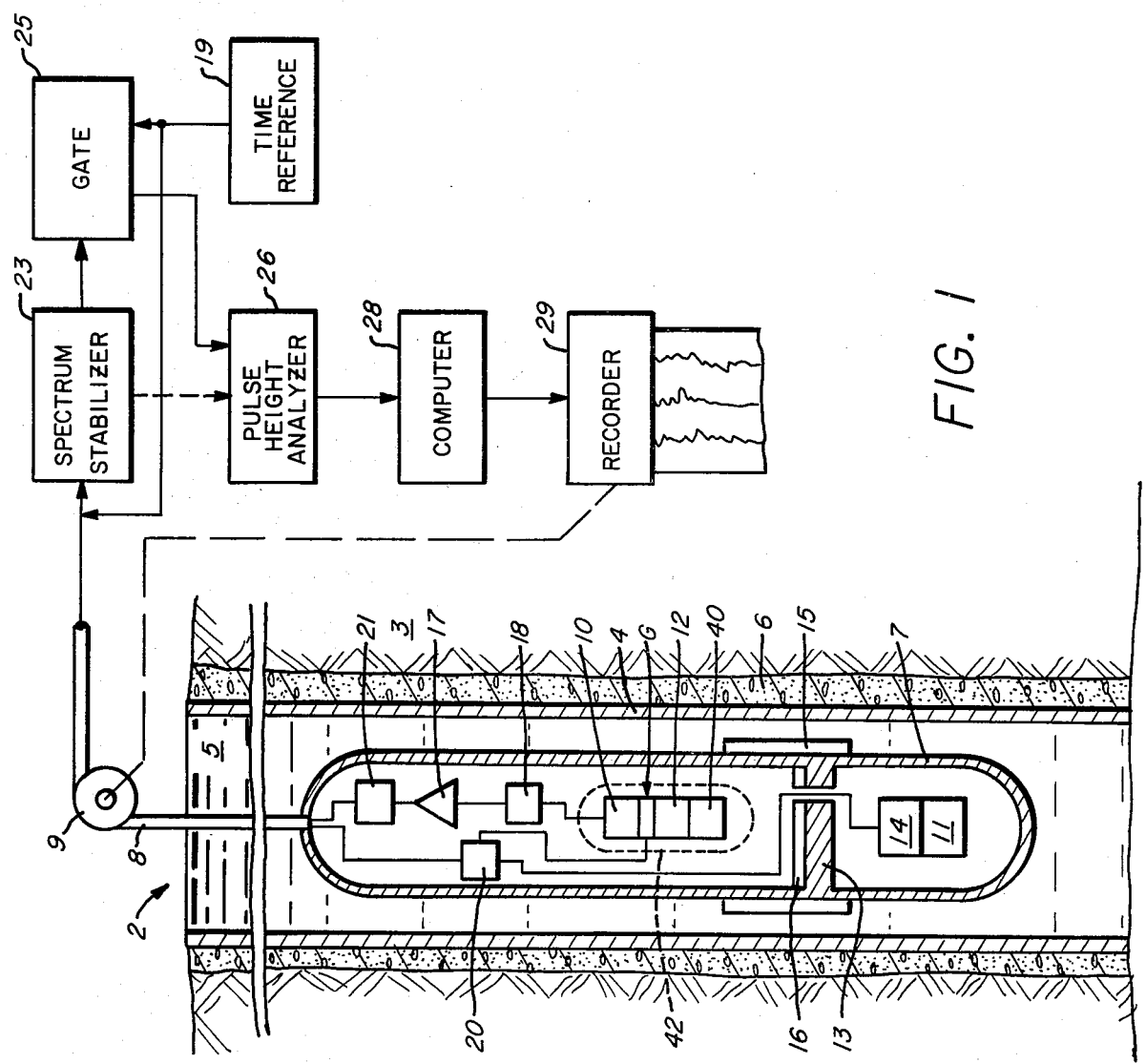
FIG. 1 is an overall schematic block diagram of a well logging system in accordance with the present invention.

Referring initially to FIG. 1, there may be seen a simplified functional representation in the form of a block diagram of well logging apparatus in accordance with the present invention. A borehole 2 penetrating earth formations 3 is lined with a steel casing 4 and filled with a well fluid 5. The steel casing 4 is cemented in place by a cement layer 6 which also served to prevent fluid communication between adjacent producing formations in the earth 3.

The downhole portion of the logging system may be seen to be basically composed of an elongated, fluid tight, hollow body member or sonde 7 which, during the logging operation is passed longitudinally through the casing 4 and is sized for passage therethrough. Surface instrumentation whose function will be discussed in more detail subsequently is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional armoured well logging type and may have one or more electrical conductors for transmitting such signals between the sonde 7 and the surface apparatus.

Again referring to FIG. 1, the sonde 7 contains a high energy neutron source 11. The neutron source contemplated for use herein may be any suitable pulsed neutron source. However, it will be understood by those skilled in the art that the invention is not limited thereto and that continuous neutron sources may be used if desired. A radiation detector comprising a photomultiplier tube 10 and a detector scintillation crystal 12 is provided in the sonde 7 for detecting gamma rays resulting from the inelastic scattering of high energy neutrons by the earth formations 3 surrounding the well borehole 2. A gain stabilization apparatus or gain stabilizer G, whose structure is set forth in detail below, is mounted between the photomultiplier tube 10 and detector crystal 12 of the radiation detecting portion of the apparatus.

A radiation shield 13 of iron, lead or other suitable material is interposed between the neutron accelerator 11 and the detector crystal 12 of the apparatus. Additionally, a thermal neutron shielding sleeve 15 may be provided as shown about the detector crystal 12 on either the interior or the exterior wall portion of the sonde. A thermal neutron shielding disk 16 is interposed between the radiation shielding material 13 and the detector crystal 12 to reduce the probability of thermal neutrons reaching the detector crystal. The detector crystal 12 is preferably one formed from thallium doped sodium iodide, although it may also be of cesium iodide or other like activated material which is optically coupled through the gain stabilizer G to the photomultiplier 10.

The radiation shielding 13 reduces the probability of direct irradiation of the detector crystal by neutrons emitted from the pulsed neutron source or accelerator 11. The thermal neutron shielding disk 16 and cylinder 15 surrounding the detector crystal may be comprised of boron or any other suitable material having a high thermal neutron capture cross section. This shield serves to further reduce the possibility of thermal neutrons which follow a tortuous path and have been slowed by the borehole fluid 5 or the shielding material 13 from reaching the vicinity of the detector crystal and possibly causing neutron activation of the iodine or other elements comprising the crystal. Moreover, when a pulsed neutron source is used, the thermal neutron shield reduces the probability of thermal neutrons interacting with materials in the sonde itself or the detector crystal itself and causing the emission of gamma radiation during the time period when the inelastic neutron gamma rays are being observed.

As is known, the scintillation crystal 12 produces a discrete flash of light whenever a gamma ray passes therethrough and exchanges energy with its crystal lattice. The photomultiplier tube 10 generates a voltage pulse proportional in height to the intensity of each such scintillation which occurs in the crystal 12. The intensity of such scintillations is functionally related to the energy of the gamma ray causing the light flash and thus a voltage pulse generated by the photomultiplier tube 10 has an amplitude functionally related to the energy of the corresponding gamma ray. These proportional voltage pulses produced by photomultiplier tube 10 comprise a detector signal which is supplied to a linear amplifier 17 via a discriminator 18. The discriminator 18 may be used if desired to discriminate, for example, against low energy background gamma radiation resulting from the thermal activation of the detector crystal by the reaction $I^{127}(N,\gamma) I^{128}$. A preset bias level may be used to pass only pulses from the photomultiplier tube 10 exceeding the height corresponding to 1.78 MeV gamma rays generated in the inelastic scattering of neutrons by silicon. Low energy background gammas contributing to pulse pileup could be eliminated in this manner. Also, the discriminator, being located downhole, reduces the counts rate supplied to the cable, thus enhancing the possibility of not having pulse pileup.

For pulsed neutron sources, the neutron accelerator 11 is preferably operated by a pulsing circuit 14, which may be of conventional design as known in the art, and functions to operate the accelerator in short duration pulses. The pulsing circuit 14 may be controlled by timing pulses from a surface timing reference 19 communicated over the conductors of cable 8 and which may also be provided to a downhole reference pulser 20. For example, the pulsing circuit 14 could be activated by a timing pulse from time reference 19 to emit a neutron burst of a specified time duration. The frequency of such bursts would then be controlled by the surface timing reference 19. Timing reference 19 may also be located in the sonde, if desired.

During the time the neutron accelerator 11 is activated, output signals from the photomultiplier tube 10 are conducted via the discriminator 18 and the linear amplifier 17 to a cable driver circuit 21 of conventional design. Pulses are fed from the cable driver circuit 21 over the cable 8 to a gate 25 at the surface.

Since both the downhole pulse generator 14 and the surface gate 25 which control data pulses from the downhole tool are timed from the same time reference 19, it is apparent that synchronism may be maintained between the surface equipment and the downhole equipment. Thus, the data signals may be gated in a manner at the surface to select portions thereof for processing which are timed as desired relative to the emission of the neutrons.

Although not depicted in FIG. 1, it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

The output signals from the cable 8 are furnished to the gate 25 and are first processed in a spectrum stabilizer circuit 23 which responds to reference energy level pulses formed in the photomultiplier tube in response to the gain stabilizer G in a manner to be set forth. The spectrum stabilizer utilizes the reference energy level pulses to stabilize the gain of the well logging apparatus, and a gain control signal is furnished from spectrum stabilizer 23 to a pulse height analyzer 26, as schematically indicated.

The pulses from cable 8 are then fed from the spectrum stabilizer 23 through the gate 25 to the pulse height analyzer 26. These pulses comprise a sequence of count pulses resulting from gamma rays detected by the downhole detector crystal 12 which are supplied to pulse height analyzer 26. The pulse height analyzer 26 may be of conventional design as known in the art and having, for example, a suitable number of channels or energy divisions corresponding to quantizations of the pulse heights of the input pulses, if desired. The pulse height analyzer 26 functions to sort and accumulate a running total of the incoming pulses into a plurality of storage locations or channels based on the height of the incoming pulses which, it will be recalled, is directly related to the energy of the gamma rays causing the pulse.

The output of the pulse height analyzer 26 is furnished to a computer 28 for processing and analysis of the pulses to form well logging data concerning the formations 3 and fluids in the vicinity of the borehole 2. A suitable recorder 29 is connected to the computer for forming an output data display of the processing results from computer 28, usually as a function of borehole depth.

Figure 2:
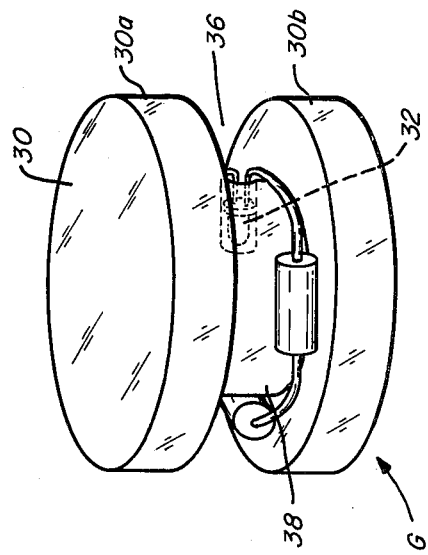
FIG. 2 is an isometric view of a gain stabilization apparatus of the system of FIG. 1.
Figure 3:
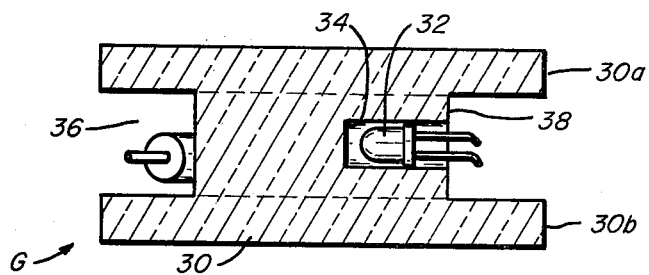
FIG. 3 is a cross-sectional view of the apparatus of FIG. 2.

Considering now the gain stabilizer G more in detail (FIGS. 2 and 3), a cylindrical disk 30 formed of an optically transparent material, for example a synthetic resin such as that sold under the trademark "Lucite", is mounted with a cylindrical axis thereof extending (FIG. 1) between the scintillation detector crystal 12 and photomultiplier tube 10 in the sonde 7.

A light emitting diode 32, commonly referred to as an LED, is mounted in a radially inwardly extending opening 34 formed in the disk 30. The LED 32 is energized by a pulser circuit 20, which comprises conventional integrated circuits, and in response thereto emits light pulses which pass through the optically transparent material of the disk 30 and are sensed by the photomultiplier tube 10. Because of the location of the disk 30, having the LED 32 therein, between the crystal 12 and photomultiplier 10, the disk 30 optically couples light scintillations from both LED 32 and crystal 12 to the photomultiplier 10. The pulser 20 causes the light emitting diode 32 to emit light pulses of substantially constant intensity and frequency which are sensed by the photomultiplier 10 and transmitted by the amplifier 18 and cable driver circuit 20 over the cable 8 to the spectrum stabilizer 23.

Figure 4:
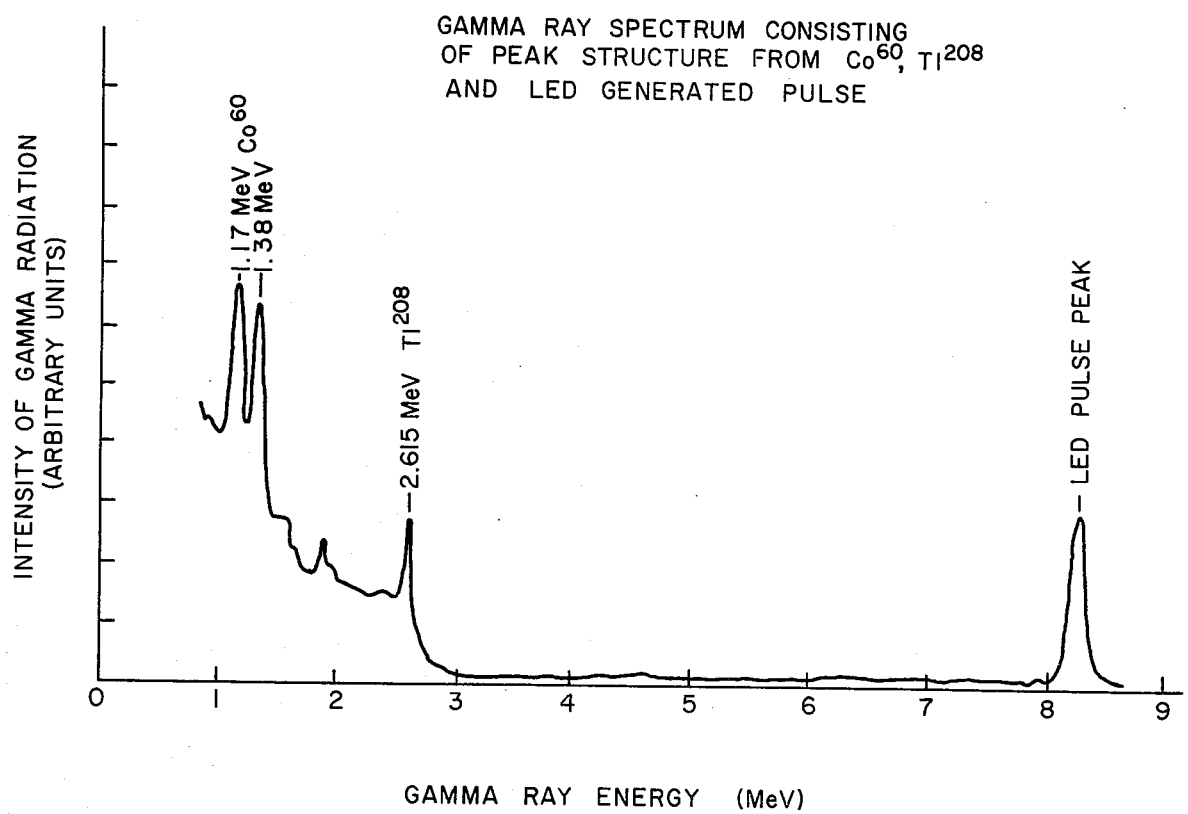
FIG. 4 is a typical gamma ray spectrum obtained during testing of the apparatus of FIG. 2.

Accordingly, a reference light source peak is formed in the LED 32 and sensed by each of the same components of the well logging apparatus that sense gamma radiation and form electrical signals in response thereto during well logging operations, including the photomultiplier tube 10. Thus, a reference energy level is generated in the sonde which can be measured and monitored for gain stabilization purposes. FIG. 4 illustrates a typical gamma ray spectrum of peak structure from $CO^{60}$, $Tl^{208}$ (Thorium$^{232}$ series) and a gamma ray energy peak above 8.0 MeV from the LED 32.

Considering again the gain stabilizer G (FIGS. 2 and 3), a groove 36 may be formed extending inwardly to a cylindrical surface 38 of the disk 30 between outer surfaces 30a and 30b and have components (as shown) of a temperature compensating circuit 40 (FIG. 1) mounted thereon. The temperature compensating circuit 40 is utilized to compensate for variations in temperature in the sonde 7 during well logging operations. For additional temperature stability, the compensating circuit 40, gain stabilizer G, photomultiplier tube 10 and scintillation crystal 12 are contained in a temperature controlled dewar flask, schematically shown at 42. In this manner, temperature differences between the LED 32, compensating circuit 40 and crystal 12 are minimized.

It is to be noted that the gain stabilizer G is a separable unit from the photomultiplier 10 and crystal 12. Accordingly, additional gain stabilizers can be temperature compensated and kept on hand as spares, simplifying maintenance and repair.

The foregoing disclosure and description of the invention are illustrative and explanatory thereof, and various changes in the circuits, components and wiring, as well as in the details of the illustrated circuitry may be made without departing from the spirit of the invention.

I claim:

1. In a radioactive well logging apparatus which bombards earth formations and fluid in the vicinity of a well borehole with neutrons from a neutron source and detects resulting gamma radiation in a detector with a scintillation crystal for emitting flashes of light in response to the gamma radiation and a photomultiplier tube which forms voltage pulses in response to flashes of light furnished thereto, both said scintillation crystal and said photomultiplier tube being mounted in a sonde with a space therebetween, a gain stabilization apparatus comprising:
   a light emitting diode;
   oscillator means for causing said light emitting diode to emit light pulses; and
   means for mounting said light emitting diode between said scintillation crystal and said photomultiplier tube, said means for mounting comprising a disk of optically transparent material positioned in said space with an axis thereof extending between said scintillation crystal and said photomultiplier tube and including a groove formed about an outer surface of said disk for receipt of said oscillator means therein, said means for mounting further optically coupling light pulses from said light emitting diode for gain stabilization and scintillations from said scintillation crystal to said photomultiplier tube for well logging.

2. The apparatus of claim 1, wherein said oscillator means comprises:
   means for causing said light emitting diode to emit light pulses of substantially constant intensity.

3. The apparatus of claim 1, wherein said oscillator means comprises:
   means for causing said light emitting diode to emit light pulses of substantially constant frequency.

4. The apparatus of claim 1, wherein said scintillation crystal is formed from sodium iodide.

5. The structure of claim 1, wherein said disk substantially fills said space between said scintillation crystal and said photomultiplier.

6. The structure of claim 1, further including an opening extending inwardly from said groove in said disk for receipt of said light emitting diode therein.

7. The structure of claim 6, wherein said disk is cylindrical and said groove is annular and further including an opening extending radially inwardly from said annular groove in said disk for receipt of said light emitting diode therein.

8. The apparatus of claim 1, further including:
   temperature compensating circuit means.

9. The structure of claim 8, wherein said photomultiplier, said scintillation crystal, said light emitting diode, said oscillator means, said means for mounting and said temperature compensation circuit means are mounted in a dewar flask in a sonde for movement in the well borehole.

10. The apparatus of claim 1, wherein said light emitting diode emits radiation which is at an energy level above 8.0 MeV.

* * * * *